US005969633A

United States Patent [19]
Rösler

[11] Patent Number: 5,969,633
[45] Date of Patent: Oct. 19, 1999

[54] DEVICE FOR CLEARING AND/OR ACTIVATING AN OBJECT

[76] Inventor: Klaus-Dieter Rösler, Föhrenweg 19, 28844 Weyhe-Jeebel, Germany

[21] Appl. No.: 08/910,493

[22] Filed: Aug. 4, 1997

[30] Foreign Application Priority Data

Aug. 2, 1996 [DE] Germany ........................ 296 13 136 U

[51] Int. Cl.[6] ..................................................... G06K 19/00
[52] U.S. Cl. ............................... 340/825.34; 340/825.31; 235/380; 235/382; 235/382.5; 380/23
[58] Field of Search ......................... 340/825.31, 825.34; 235/380, 382, 382.5, 379, 380.2; 380/4, 29, 23; 180/287; 307/10.2

[56] References Cited

U.S. PATENT DOCUMENTS 4,866,422 9/1989 Dunnett et al. ........................ 340/539
5,694,100 12/1997 Jacquet et al. .......................... 335/120

FOREIGN PATENT DOCUMENTS 0 314 361 5/1989 European Pat. Off. .
43 47 351 5/1994 Germany .
WO 90/15211 12/1990 WIPO .

*Primary Examiner*—William A. Cuchlinsky, Jr.
*Assistant Examiner*—Yonel Beaulieu
*Attorney, Agent, or Firm*—Merchant & Gould P.C.

[57] ABSTRACT

The invention concerns a device for clearing and/or activating an object, in particular a machine, with a codable key, an input device for inputting a code, a coding device for coding the key with the entered code, a reader for reading a code found on the key, an evaluation unit for evaluating this code, and a clearing device, which, when a code has been accepted by the evaluation unit, clears for use and/or activates the object depending upon the code, the code containing use-specific data such as customer identification, object identification, time period for use, and operational data for controlling the clearing device and/or the object. At least the input device, the coding device, the reader, and the clearing device are arranged on the object, and the key is coded by means of the coding device via the input device before the beginning of a single or repeated use of the object.

22 Claims, 3 Drawing Sheets

DEVICE FOR CLEARING AND/OR ACTIVATING AN OBJECT

Figure 1:
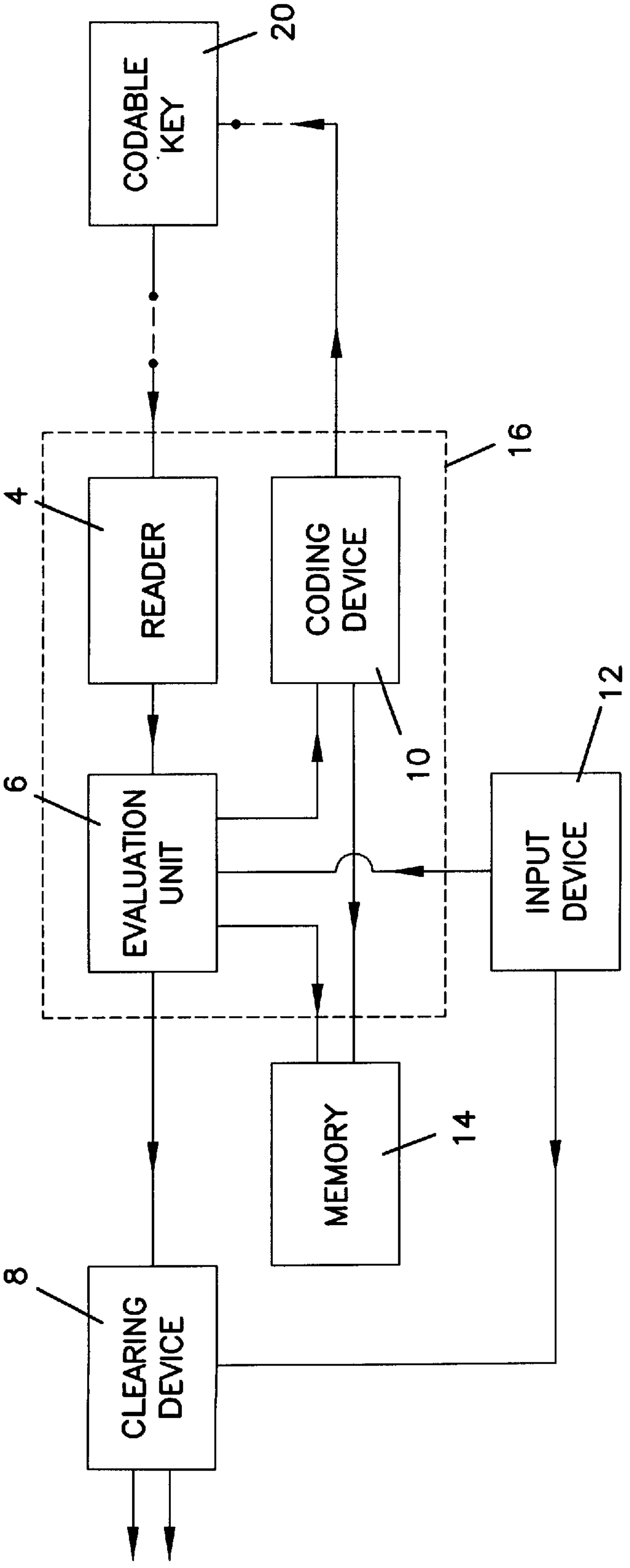

The invention concerns a device for clearing and/or activating an object, in particular a machine, with a codable key, an input device for inputting a code, a coding device for coding the key with the code put in, a reader for reading a code found on the key, an evaluation unit for evaluating this code, and a clearing device, which, when a code has been accepted by the evaluation unit, clears the object for use and/or activates it depending on the code, which contains specific use data such as customer identification, object identification, time period for use, and operating data for controlling the clearing device and/or the object.

A device of this type is known from WO 90 15 211 A1. This device makes use of the possibility of placing recallable codes onto a magnetic strip or into the data memory of an electronic chip. By this means, it is possible to allow a user the merely temporary use of an object, "object" being understood here as, for example, vehicles, data-processing equipment, construction machinery, car lifts, and other industrial devices or areas, for example residences, hotel rooms, ticket halls, and security zones. After exhaustion of the scope of use fixed in the code, for example after the running out of a use time period, the coded keys are no longer accepted by the evaluation unit and are thus unusable.

This known device has the disadvantage that the lessor of the object must provide for the coding of a key and must pass this coded key on to the user. Thus the key is either sent or personally handed over to the user. Both procedures are time-intensive and costly. Beyond that, the user must contact the lessor upon a change of use requirements in order to obtain a new, appropriately-coded key, which can be time-consuming and tedious.

The task of the invention consists in further developing a device of the type mentioned at the beginning in such a manner that a simple, secure, and flexible clearing and/or activating of an object is made possible.

According to the invention, this task is accomplished in a device of the type mentioned at the beginning by the fact that at a minimum the input device, the coding device, the reader, and the clearing device are arranged on the object, and that the key is coded by the coding device via the input device before the beginning of a single or repeated using of the object.

The advantages of the invention consist in particular in the fact that the means for the inputting of the code and for the coding of the key are arranged on the object itself or in the immediate vicinity of the object. By this means, the user is able, on his own and at the location of the object, to code a key that is entrusted to him and is, for example, still uncoded. For this purpose, the lessor or the owner of the object conveys, for example by telephone or long-distance data transmission, to the intended user a code that takes into account the use requirements of the user. As an alternative, the code can be transmitted by radio or some other means of data transmission to the input device on the object, which code is then written into the memory of the key. The device according to the invention makes possible a saving of time and cost, since the user must simply appear at the location of the object and can there code a key for himself that confers the necessary authorization of use for the object. Furthermore, it is convenient for the user not to have to worry about returning the key after the end of use, since the code on this key is no longer accepted by the evaluation unit and therefore the object is no longer cleared by this key.

In a preferred implementation form of the invention, provision is made for a device arranged on the object to receive the key, into which device the key is insertable for the reading, or rather, evaluating of a code.

The input device preferably contains a keyboard through which a short and simple specific combination of numbers can be entered by the user, for example for the code. Alternatively, the input device contains a radio receiver or a modem and obtains the code for a key via radio or data link.

Several possibilities for coding the key present themselves: the code can, for example, be stored as magnetic information on the key. A magneto-optical storage is likewise suitable. Especially advantageous is the use of a memory chip, for example a RAM, ROM, EPROM, or EEPROM chip. Transponder systems can also be utilized for storage of the code.

An especially preferred implementation form provides for the case of a loss or theft of the key by allowing the inputting of a blocking code by means of the input device. After the inputting of the blocking code, the object is no longer cleared by the coded key, and the lost or stolen key is worthless. Nevertheless, it is possible to resume use without great expense on the part of the lessor or the customer. This requires only a new key, which can already have been made available to the user as a precaution, and a new code conveyed to the user, possibly over the telephone, or by radio or data transmission. A delay in the resumption of the use of the object is thereby avoided.

In addition or as an alternative, in a preferred variant of the object according to the invention the user can be given the ability—particularly in the case of the loss or theft of the coded key—to clear the object by inputting a short code known only to the user.

Since the user has access to the coding device, he can be given the ability by the lessor to quickly and directly influence the conditions of use of the object. For this purpose, an especially preferred implementation form provides that after the initial coding, the stipulated scope of use can be reduced or enlarged by the inputting of an additional code. This new code can be put onto the originally-coded key or onto an uncoded key or previously-coded key with a code no longer accepted. If the user, for example at the site, determines that access is required to objects that are not yet cleared, the inputting of an additional code, which is obtained from the lessor, for example by telephone, allows the user a suitably greater access. Conversely, if the user determines that the scope of use chosen is too broad and that higher costs are thereby accruing to him, the scope of use can be reduced by the user through inputting of an additional code.

It is especially advantageous when the stipulated time period for use is adaptable at the site to the real requirements. The user can thus, for example, respond in the shortest time to changed conditions. For example, if the user recognizes, during use of a rented construction machine, that his work task will not be completed during the stipulated time period for use, the user is given the possibility, through inputting an additional code, of lengthening the time period during which the construction machine can be used.

In an advantageous further development of the invention, provision is made for a data-transfer device that contains the identification data and/or operational data of the object, for example a machine, and transfers this data to a memory on the key, where it is stored. The lessor can then call up this information from the memory on the key when the user returns the key after completing his use of the object.

In addition or as an alternative, the operational data and/or identification data are storable by means of the data-transfer device in a separate memory that is arranged near the object and separate from the key or is connected to the data-transfer device via a data line. This information, as well as the coding processes carried out, can then be called up and comprehended by the lessor in the quickest and simplest manner, without contacting the user.

A preferred implementation form makes provision for a display arranged on the device according to the invention, which display, for example, informs the user about the inputting of the code (e.g. "Coding successful", "Repeat input"). Also advantageous is an indication of the status of the key (e.g. "Not coded", "coded", "Use until . . . ") and/or of the clearing device (e.g. "Blocked", "Cleared").

If the object is a machine, the clearing device is preferably an auxiliary relay, which closes the ignition circuit of the machine if the code on the key employed by the user has been accepted by the evaluation unit. In this implementation form of the invention, the machine is cleared with only one key and the motor is started at the same time or later.

According to a preferred implementation form of the invention, the object includes several pieces of equipment, all of which can be mechanically or electrically cleared or activated, as the case may be, by the same coded key. Such a universal key considerably simplifies the operation of several machines. It is also possible to code several keys with the same code, which keys are then employable by several persons for the simultaneous use of different pieces of equipment.

It is advantageous when one or several codable keys, for example still uncoded, are available to the user on the object. Since the keys are not suitable for clearing the object without appropriate coding, the keys can be placed at the object without extensive security precautions. The availability of, for example, uncoded keys at the object has the advantage that a key transfer from the lessor to the user is not necessary. Furthermore, if a coded key is lost or stolen, the object can continue to be used without delay, since the blocking code is input through the input device—for example, by data transmission from the lessor or directly by the user—and a new code is obtained from the lessor for one of the available keys that have not yet been appropriately coded.

Advantageous further developments of the invention are characterized through the features of the dependent claims.

In the following, the invention is explained using models with the aid of the drawings. They show:

FIG. 1: a block circuit-diagram of a first implementation form.

Figure 2:
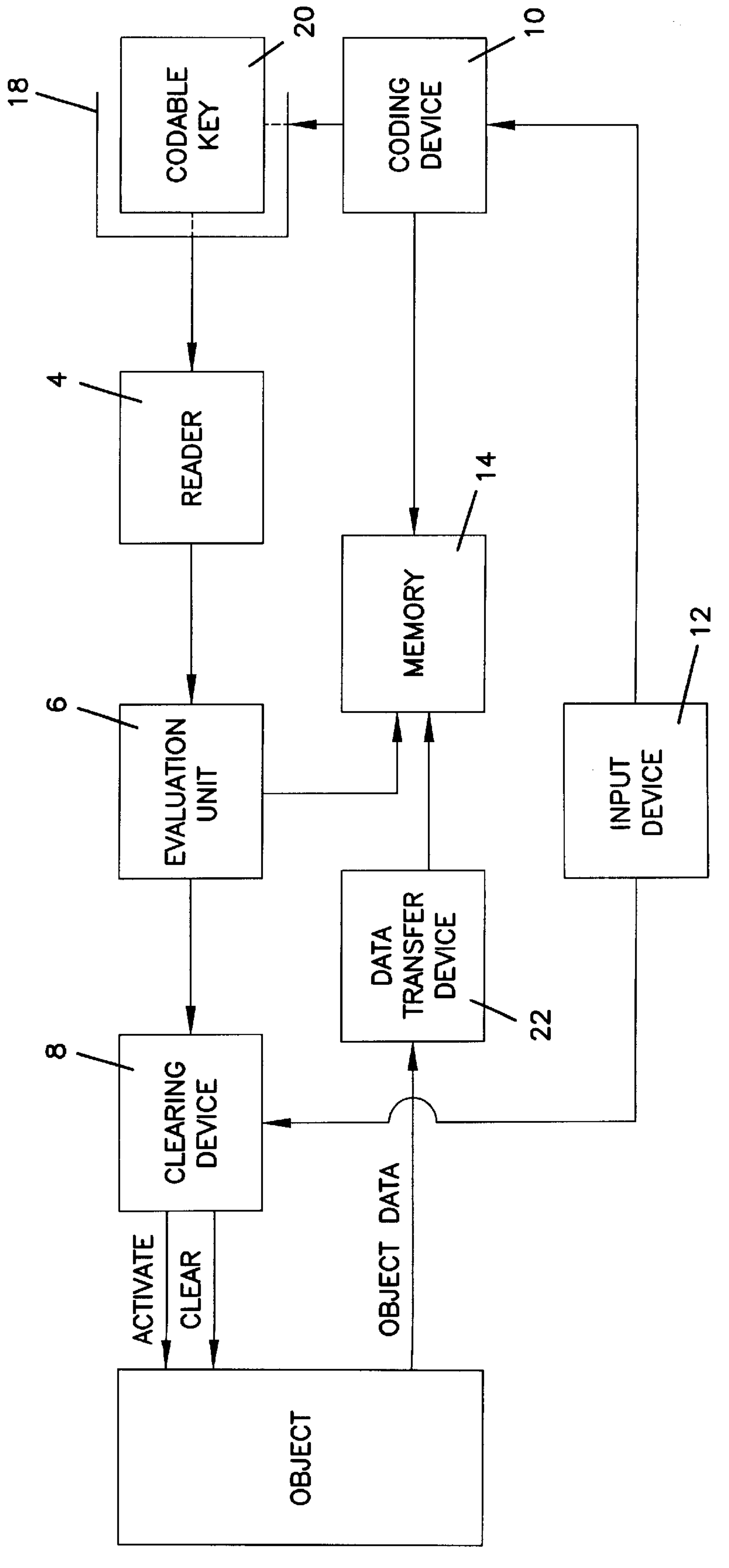

FIG. 2: a block circuit-diagram of a second implementation form.

Figure 3:
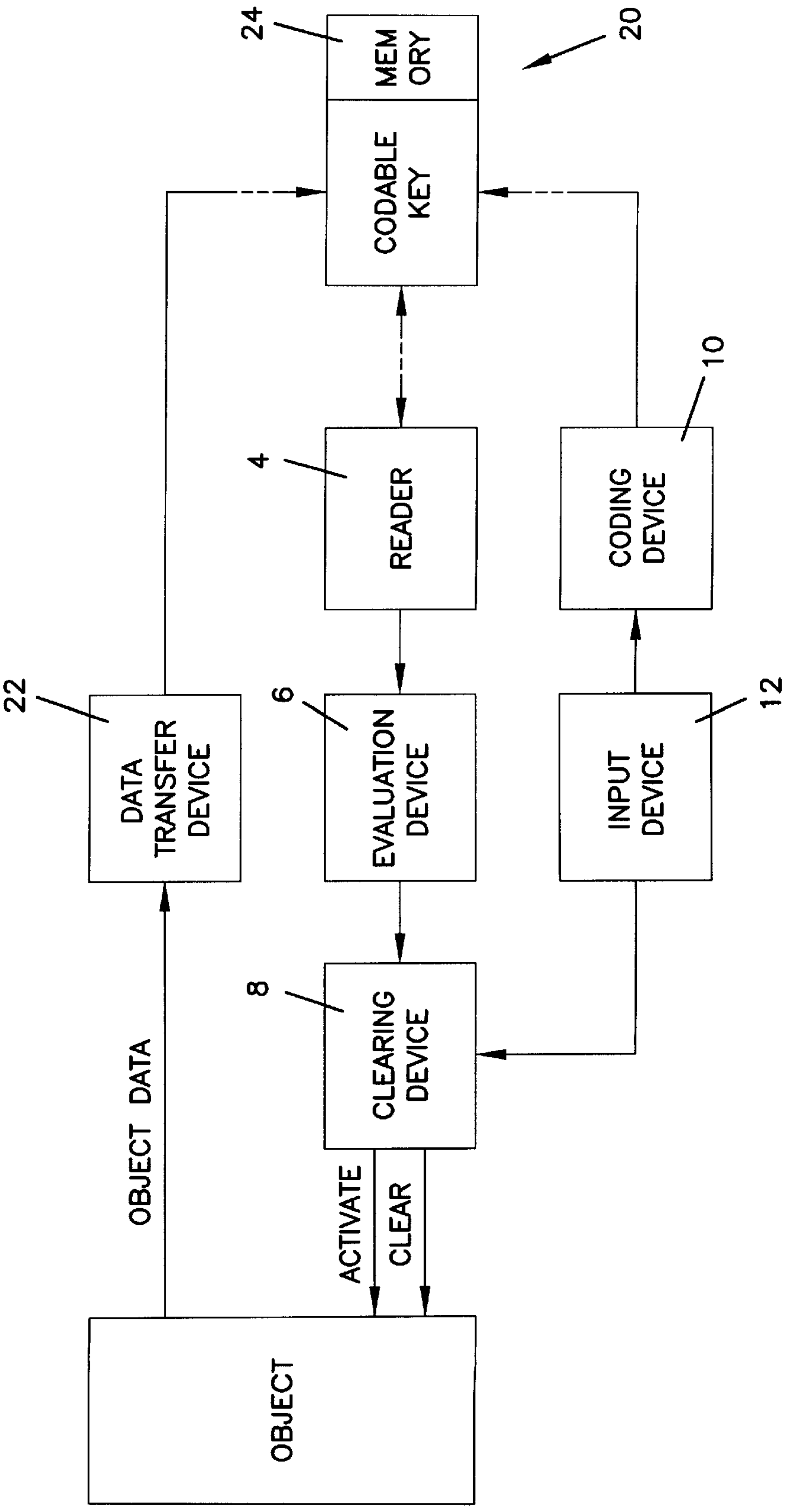

FIG. 3: a block circuit-diagram of a third implementation form.

In the block circuit-diagram of a first implementation form of the device according to the invention for clearing and/or activating an object, a codable key 20 that contains equipment for storing a code is represented schematically. This equipment comprises, for example, a magnetic strip, a magneto-optical memory, or a semiconductor chip for storing the code. The key is not arranged so as to be fixed in place at the object, but rather can be taken with by the possessor upon leaving the object.

In addition the device includes an input device 12 on the object, by means of which device codes can be entered, for example in the form of numerical codes via a keypad. The code to be input is known only to the respective user and contains use-specific data such as, for example, customer identification, object identification, time period for use, and/or other data pertaining to use. An evaluation unit 6, arranged either on the object or at another location, evaluates the input code according to predetermined criteria. The evaluation unit 6 tests, for example, whether the code is suited to the object in question and to the possible beginning of a use of the object. If the input code is accepted by the evaluation unit 6, the evaluation unit 6 directs a coding device 10 to code a key that is inserted into the coding device 10 for this purpose and receives the code into its memory. If the evaluation unit 6 does not accept a code, then the coding device 10 is not directed to code the key 20.

In the block circuit-diagram of FIG. 1, the reader 4, the evaluation unit 6, and the coding device 10 are integrated into a common processor circuit 16, which is arranged on the object.

If the coded key 20 is to be used to clear the object, the key is brought into the region of a reader 4, which is arranged on the object, in such a way that the reader 4 can read the code from the memory of the key 20. The data are transferred from the memory of the key 20 to the reader 4 either wirelessly or over an electrical lead. The reader 4 forwards the code read to the evaluation unit 6.,which tests, for example, whether the code is authorized for use of the object in question at the present time. If the code is accepted by the evaluation unit 6, the evaluation unit 6 sends a signal to a clearing device 8 provided for on the object, which clearing device thereupon clears and/or activates the object. Should the evaluation unit 6 not accept the code from the key 20, then the clearing device 8 remains blocked. After expiration of the time period for use predetermined in the code or upon occurrence of a predetermined operational event, the object is automatically blocked. The coded key 20 is then worthless, just as it is in the uncoded state.

The first implementation form shows in addition a memory 14, in which, for example, all coding processes and/or evaluation results of the evaluation unit 6 can be stored. The memory 14 is either arranged on the object, as are the remaining elements of the device with the exception of the key 20, and connected, for example, to a central computer of the lessor, or is itself a component of a central computer.

Through the inputting of a blocking code into the input device 12, the user can block the clearing device 8 of the object. A clearing or activation, as the case may be, of the object is then no longer possible with the coded key 20. This can become necessary, for example, when the user loses the coded key during the time period for use. Further use of the object is made possible for the legitimate user by his coding a new key 20 with a new code by means of the coding device 10, via the input device 12 and the evaluation unit 6. The user can ascertain the new code from the lessor or owner of the object in a quick and uncomplicated manner.

FIG. 2 shows a block circuit-diagram of a second implementation form of the device, corresponding in its essential features to the first implementation form shown in FIG. 1. In FIG. 2, provision is additionally made for a receptor device 18 for a key 20, which device is connected to the reader 4 and the coding device 10. The key 20 is inserted into the receptor device 18 for coding or clearing the object, and is then connected with the reader 4 and the coding device 10.

After a code is input via the input device 12, the code—unlike with the first implementation form—is directly forwarded to the coding device 10, which tests whether the input code satisfies the above-mentioned criteria. If this is the case, then the code is transferred via the receptor device 18 into the memory of the key 20. Alternatively, the code can be written into the memory of the key 20 by the coding device even without testing and can be first tested for validity by the evaluation unit 8 upon a subsequent use of the key.

In addition, provision is made in the second implementation form, FIG. 2, for the conveying of identification and operational data from the object to a data-transfer device 22, which then passes these data to the memory 14. These identification and operational data can contain, for example, information about the actual time period of use, necessary repair measures of the object, and its energy consumption, which can have an influence on the cost calculation. As in the first implementation form, information about the coding as well as the evaluation results can also be stored in the memory 14, all of which can be taken into consideration during the final statement of costs.

The block circuit-diagram shown in FIG. 3 shows essentially the same components as the block circuit diagram in FIG. 2. A fundamental difference consists in the fact that in the third implementation form data related to coding, code evaluation, as well as identification and operational data of the object, can be put into a memory 21 provided for on the key 20. The memory 21 can be identical with that memory in which the code is stored.

Common to all three implementation forms is the fact that, on a use of the object within the previously-stipulated scope of use, a one-time coding of the key 20 is sufficient, which coding is undertaken at the location of the object. On each subsequent use the code on the key 20 need only be read by the reader 4 and accepted by the evaluation unit 6. The input device 12 and the coding device 10 are used in addition to recode the coded key 20 when the user desires a change in the scope of use. Alternatively, a key 20 not yet properly coded can be coded with the new code, which key is available at the object for the sake of simplicity.

I claim:

1. Device for clearing and/or activating an object with a codable key, comprising:

an input device for inputting a code;

a coding device for coding the key with the input code;

a reader for reading a code found on the key;

an evaluation unit for evaluating the code;

a clearing device, when a code is accepted by the evaluation unit, the clearing device clearing and/or activating the object, depending on the code, the code containing use-specific data including customer identification data, object identification data, time period for use data, and operational data, for controlling the clearing device and/or the object; and at least the input device, the coding device, the reader, and the clearing device being arranged and configured on the object, and the key being coded by the coding device via the input device before beginning of use of the object.

2. Device according to claim 1, wherein the evaluation unit is arranged and configured on the object.

3. Device according to claim 1, wherein a receptor device is arranged and configured on the object for receiving the key, the key is insertable into the receptor device for the input of a code.

4. Device according to claim 1, wherein the input device contains a keypad for receiving and inputting the code.

5. Device according to claim 1, wherein the code is stored on the key in a memory chip.

6. Device according to claim 1, wherein the code is a blocking code entered by the input device, the blocking code blocks the clearing device.

7. Device according to claim 1, wherein the code is a short code entered by the input device, the short code clears the clearing device.

8. Device according to claim 1, wherein after inputting a first code, a stipulated scope of use of the key is changeable through inputting a second code.

9. Device according to claim 1, further comprising a data-transfer device for transferring the operational data of the object, the object identification data, and executed recodings of the key to a memory on the key.

10. Device according to claim 1, further comprising a data-transfer device for transferring data, and a memory separate from the key for storing data, and the operational data of the object, the object identification data, and executed recodings of the key are entered into the memory.

11. Device according to claim 9, wherein the data-transfer device is arranged and configured on the object.

12. Device according to claim 1, wherein the reader, the evaluation unit, and the coding device are integrated into a common processor circuit.

13. Device according to claim 1, wherein the object is a part of a machine which has an ignition circuit, the clearing device further contains an auxiliary relay that closes the ignition circuit of the machine if the code is accepted by the evaluation unit.

14. Device according to claim 1, wherein the object is a part of an equipment that is cleared and/or activated, the key serves for clearing and/or activating of the equipment.

15. Device according to claim 1, at least one codable key is available to a user at the object.

16. Device according to claim 1, wherein the input device contains a radio receiver for receiving and inputting the code.

17. Device according to claim 1, wherein the input device contains a modem for receiving and inputting the code.

18. Device according to claim 1, wherein the code is stored on the key in a magnetic memory of a memory chip.

19. Device according to claim 1, wherein the code is stored on the key in a magneto-optical memory of a memory chip.

20. Device according to claim 1, further comprising a data-transfer device for transferring the operational data of the object, the object identification to a memory on the key.

21. Device according to claim 1, further comprising a data-transfer device for transferring data, and a memory separate from the key for storing data, and the operational data of the object and the object identification data are entered into the memory.

22. Device according to claim 1, wherein the reader, the evaluation unit, the coding device, and the data-transfer device are integrated into a common processor circuit.

* * * * *